United States Patent [19]

Fassbender

[11] Patent Number: 5,072,586
[45] Date of Patent: Dec. 17, 1991

[54] HYDROSTATIC SERVO-ASSISTED STEERING SYSTEM, PARTICULARLY FOR MOTOR VEHICLES

[75] Inventor: Rolf Fassbender, Mutlangen, Fed. Rep. of Germany

[73] Assignee: Zahnradfabrik Friedrichshafen, AG., Friedrichshafen, Fed. Rep. of Germany

[21] Appl. No.: 469,575

[22] PCT Filed: Nov. 12, 1988

[86] PCT No.: PCT/EP88/01034
§ 371 Date: Apr. 18, 1990
§ 102(e) Date: Apr. 18, 1990

[87] PCT Pub. No.: WO89/04788
PCT Pub. Date: Jun. 2, 1989

[30] Foreign Application Priority Data
Nov. 26, 1987 [DE] Fed. Rep. of Germany ....... 3740120

[51] Int. Cl.⁵ .............................................. F16D 31/02
[52] U.S. Cl. ...................................... 60/384; 60/452; 180/132
[58] Field of Search .................... 60/384, 387, 452; 180/132

[56] References Cited

U.S. PATENT DOCUMENTS

| | | | |
|---|---|---|---|
| 3,492,817 | 2/1970 | Adams | 60/386 |
| 4,043,419 | 8/1977 | Larson et al. | 60/450 X |
| 4,096,883 | 6/1978 | Yip | 60/384 X |
| 4,109,679 | 8/1978 | Johnson | 60/384 X |
| 4,344,283 | 8/1982 | Liebert et al. | 60/384 |
| 4,454,716 | 6/1984 | Rau | 60/452 X |
| 4,466,243 | 8/1984 | Liebert et al. | 60/384 |
| 4,553,389 | 11/1985 | Tischer et al. | 60/384 |
| 4,618,017 | 10/1986 | Liebert et al. | 180/132 X |
| 4,665,695 | 5/1987 | Rau et al. | 60/384 |

Primary Examiner—John T. Kwon
Assistant Examiner—Thomas Denion
Attorney, Agent, or Firm—Albert M. Zalkind

[57] ABSTRACT

A hydrostatic auxiliary power steering mechanism with load-dependent performance for controlling a variable displacement pump includes an orifice for generating a pressure difference. A control valve in a valve borehole contains a movable valve piston. Orifice is formed between the discharge opening cross-section of a pressure line into the valve borehole and a central spool land provided on valve piston and reveals a cross-section that can be altered as a function of the position of the control valve. The cross-section of orifice has its smallest value when the control valve is in the neutral middle position and can be made larger by adjusting the control valve in both directions.

5 Claims, 3 Drawing Sheets

HYDROSTATIC SERVO-ASSISTED STEERING SYSTEM, PARTICULARLY FOR MOTOR VEHICLES

BACKGROUND OF THE INVENTION

This invention relates to a hydrostatic auxiliary power steering mechanism, especially for motor vehicles. The auxiliary power steering mechanism contains a metering device and a control valve which channels the pressure medium which is fed to a steering motor by a variable displacement or a constant pump via a current divider valve. In the pressure line, there is provided an orifice by virtue of whose pressure difference one can activate an adjusting device of the variable displacement pump or of the current divider valve. The feed from the pressure into the valve borehole is guided via a central piston collar which is arranged on a valve piston that is movably positioned in the valve borehole.

BRIEF DESCRIPTION OF THE PRIOR ART

Such a hydrostatic auxiliary power steering mechanism is known, for example from German Patent No. 31 32 342. The pressure medium is supplied in a load-dependent fashion to the privileged steering gear by means of such a steering mechanism. Here the orifice is made with a constant cross-section for load-dependent output allocation. A constant pilot flow is delivered via the orifice when the control valve is in the neutral position. In case of adjustment of the control valve, the connections to the metering device and to the steering motor are already controlled after a small valve adjustment. The pilot flow must then be choked so that one can set a pressure that will correspond to the steering resistance. The pressure rises as the valve adjustment increases. When the set pressure overcomes the steering resistance, pressure medium is branched off in front of the orifice and is supplied to the steering motor via the metering device. As a result, the pressure difference over the orifice is altered so that the adjustment of the variable pump will occur. In case of high steering resistances, the variable pump will receive a regulating signal only when the control valve is completely deflected. The late regulating signal leads to dynamic problems such as oscillations in the steering system. The purpose of the invention is to improve the known hydrostatic auxiliary power steering mechanism so that a regulating signal is supplied early on to the adjusting pump independently of the steering resistance. The new mechanism is to be housed within the dimensions of the known control valve.

SUMMARY OF THE INVENTION

The hydrostatic auxiliary power steering mechanism of the invention includes a orifice having a crosssection that can be altered as a function of the setting position of the control valve and that has its smallest value when the control valve is in the neutral middle position. The orifice can be enlarged in both directions in case of an adjustment of the valve. This is achieved by forming the orifice between the discharge cross-section of the pressure line into the valve borehole and the central piston collar. Because the valve piston is made symmetrically in both directions with respect to the orifice, the alteration of the orifice cross-section will be the same in both directions of steering. The adjustable orifice and its control mechanism can be housed within the dimensions of the known control valve device. By virtue of the arrangement and design of the orifice according to the invention, the variable pump receives a regulating signal after the control valve has traveled a very small adjustment distance so that oscillation-free regulation of the adjusting pump is possible.

If the central piston collar is made wider than the maximum axial extent of the discharge-cross-section of the pressure line into the valve borehole, then the pressure line is closed when the control valve is in the neutral middle position. In this position, the smallest cross-section of the orifice has the value zero. In a practical manner, the segment of the pressure line located behind the orifice and the control line are connected to the piston borehole by a common connection which is located in the area of the central piston collar. If, in the process, the width of the central piston collar is made smaller than the smallest axial extent of the cross-section of the common connection, then the control line—with the control valve in the neutral middle position—is connected with the valve line in a simple manner.

If the mechanism according to the invention is to be used in a hydrostatic auxiliary power steering mechanism, where a small short-circuit oil stream is to be supplied for heating purposes through the control valve also in the neutral middle position, then the central piston collar is in a practical manner provided with a revolving perforation about its circumference. section of the pressure line into the valve borehole with the common connection for the segment of the pressure line lying behind the orifice and the control line and thus with the valve line.

BRIEF DESCRIPTION OF THE FIGURES

The invention will be explained in greater detail below with the help of two practical examples given in the drawing; in which.

DETAILED DESCRIPTION

Figure 1:
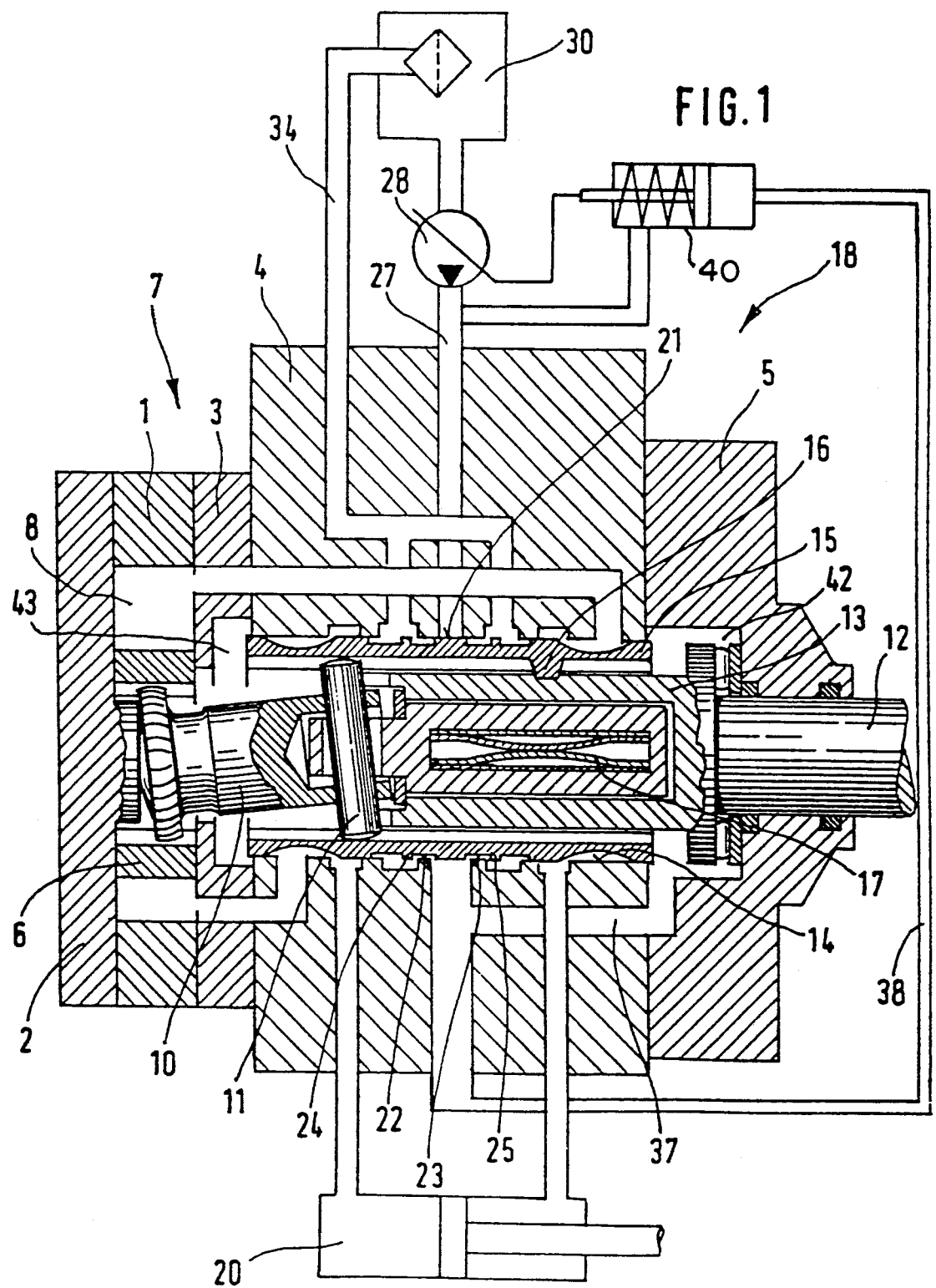
FIG. 1 is a cross-sectional view through the hydrostatic auxiliary power steering mechanism according to the invention.
Figure 2:
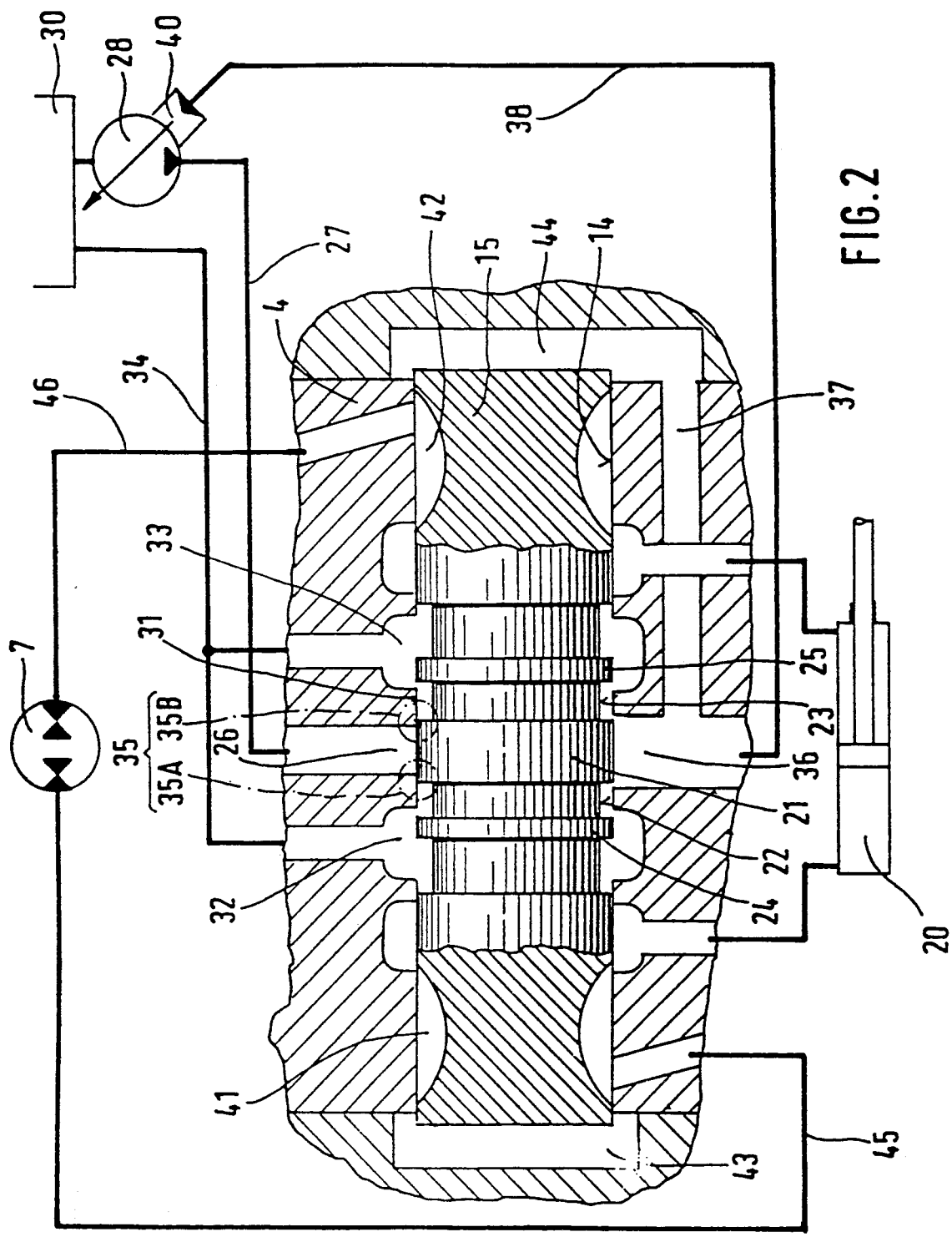
FIG. 2 is a cross-section view through the control valve of a preferred embodiment of the invention.

In the hydrostatic auxiliary power steering mechanism according to the invention and shown in FIGS. 1 and 2, there is provided an internally-toothed tooth ring 1 between an end closure 2 and an intermediate deflection ring 3 of a housing 4 and it is connected with the latter and another end closure 5 by means of screws that are not illustrated in the drawing. An externally-toothed gear wheel 6 has one tooth less than the tooth ring 1 and, together with the latter, forms a metering device 7 in the shape of a manual gear wheel pump. Displacement chambers 8 are formed between the teeth of tooth ring 1 and gear wheel 6 and the front surfaces of end closure 2 which adjoin the two parts and the intermediate deflection ring 3.

Gear wheel 6 is connected via a drive shaft 10 and a follower pin 11—provided with torsional play—with a control shaft 12. Control shaft 12 carries a hollow activation sleeve 13.

A valve piston 15 is positioned coaxially with respect to activation sleeve 13 in a valve borehole 14 arranged in housing 4. Valve piston 15 can be shifted axially in both directions via coarse thread profiles 16, arranged between activation sleeve 13 and valve piston 15, in case of a rotary motion of the control shaft 12. A spring element 17 is arranged between the drive shaft 10 and the control shaft 12.

Valve piston 15, in valve borehole 14, together with the surrounding parts forms a control valve 18. On valve piston 15 and in valve borehole 14, there are arranged, in the known fashion, grooves for routing the pressure medium to and from the displacement chambers 8 of the metering device 7 and to and from the pressure chambers of a steering motor 20. As for the operation it is important to make sure that valve piston 15 reveals a central spool land 21 and a piston groove 22, on either side thereof limited by spool lands 24, 25. In the area of the axial extent of the central spool land 21, there is arranged a discharge point 26—leading to valve borehole 14—of a pressure line 27 through which pressure medium is fed from a high-pressure variable displacement pump 28 out of a reservoir 30 to the control valve 18. The discharge point 26 is in a cylindrical housing crosspiece 31 having on both sides valve grooves 32, 33. Valve grooves 32 and 33 are connected with the reservoir 30 via a valve line 34.

Between the cross-section of the delivery point of the pressure line 27 into the valve borehole 14 and the central land 21 there is formed an orifice 35 in the shape of two variable control openings 35A and 35B. Control openings 35A and 35B and thus also the diaphragm 35 are closed when valve piston 15 is in the neutral middle position.

Orifice 35 serves to generate a pressure difference which is needed for the adjustment of the variable pump 28. In the area of the axial extent of the central land 21, there is provided a common discharge opening 36 into valve borehole 14 for a segment 37—located behind orifice 35—of a pressure line 27 and for a control line 38. The pressure prevailing behind orifice 35 is transmitted via the control line 38 to an adjusting device 40 of variable displacement pump 28. In place of variable pump 28, one can provide a constant pump with a load dependent adjustable current divider valve.

The width of the central spool land 21 is smaller than the smallest axial extent of the cross-section of the common opening 36. The width of the cylindrical housing crosspiece 31 is smaller than the interval between the lands 24 and 25. Thus, when the piston 15 is in the neutral position, the control line 38 is connected via piston grooves 22 and 23, valve grooves 32 and 33, and valve line 34 with the reservoir 30.

On both ends of the valve 15 are provided circumferential distribution grooves 41, 42 which—in case of an axial shift of valve piston 15—are connected with one of two pressure chambers 43, 44 that adjoins valve piston 15 on its face. The distribution grooves 41 and 42 furthermore serve as commutation grooves and are connected with the pressure chambers 8 of metering device 7 via lines 45 and 46 in a known manner.

To achieve complete radial pressure equalization in control valve 18, it is practical to make the discharge opening 26 in one plane and to make the common opening 36 in another plane.

Figure 3:
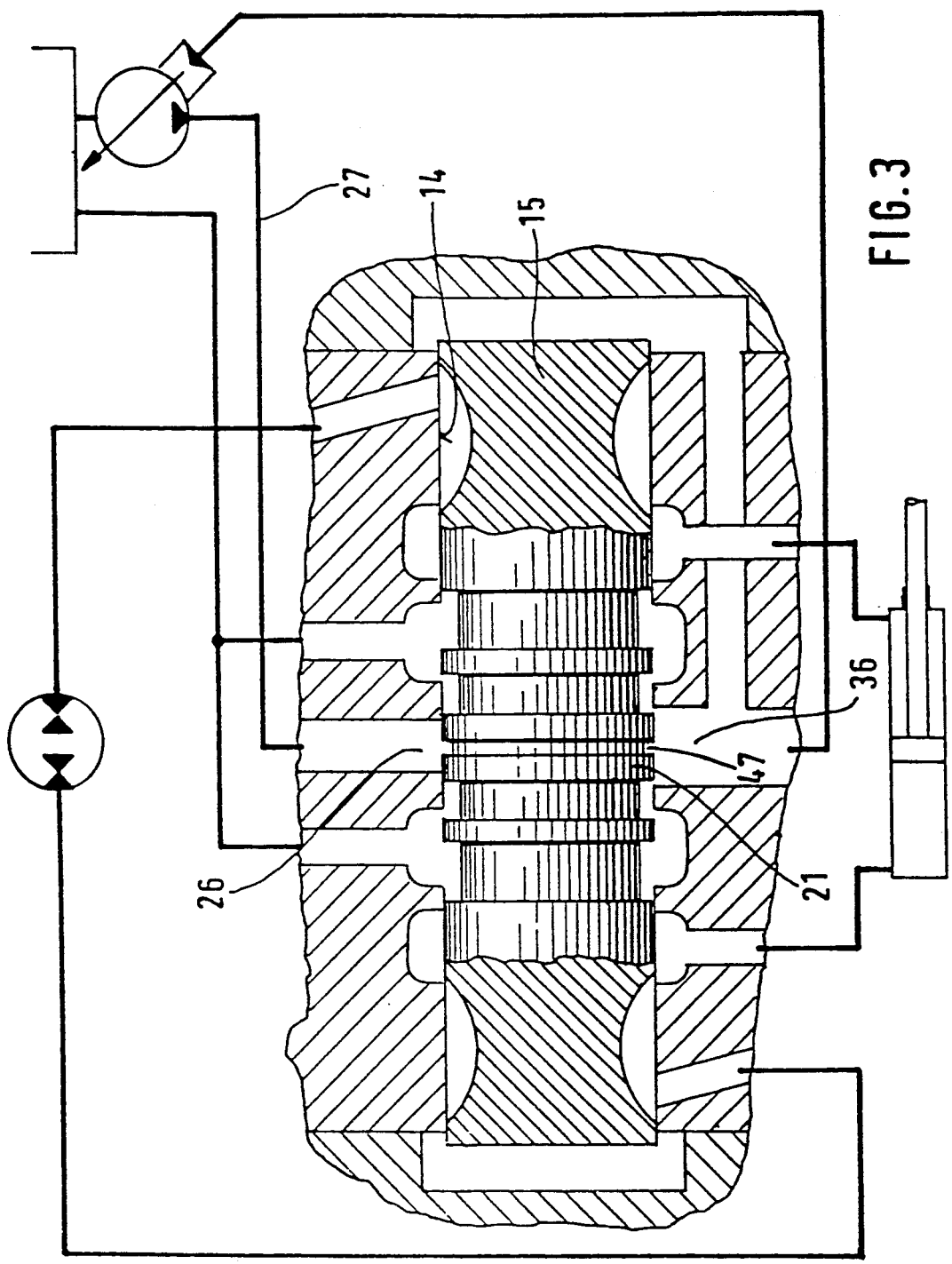
FIG. 3 is a cross-sectional view through the control valve of a second embodiment of the invention.

The second embodiment illustrated in FIG. 3 differs from the first embodiment illustrated in FIGS. 1 and 2 by virtue of the fact that the orifice is not completely closed when the control valve 18 is in the neutral middle position but rather has a minor minimum cross-section. For this purpose an annular groove 47 is provided in the land 21 which creates a connection from the discharge opening 26 of pressure line 27 into the valve borehole 14 to the common opening 36. When the gear is not activated, a pressure medium flows through the groove 47 at a pressure in accordance with the cross-section of the groove for tempering control valve 18.

One could make such a short-circuit connection through the control valve 18 by making sure that the axial extent of the cross-section of discharge opening 26 into valve borehole 14 is greater than the width of the central land 21. In this arrangement, however, the size of the connection cross-section between discharge opening 26 and the common opening 36 will depend on the exact middle position of valve piston 15. With the groove 47, the cross-section is independent of the exact middle position of valve piston 15.

The operation of the steering mechanism will be described in greater detail below with the help of the practical example given in FIG. 2. Variable displacement pump 28 tries to maintain a constant pressure difference between pressure line 27 and control 38. Because the axial extent of the discharge opening cross-section 26 of the pressure line 27 into valve borehole 14 is smaller than the width of the central land 21, this is possible when the valve piston 15 is in the neutral middle position in case of a pressure medium flow of the pump 28 which goes toward zero. This is so because the connection cross-section between pressure line 27 and control line 48 likewise moves toward zero. The connection of control line 38 with the reservoir 30 is required when valve piston 15 is in the neutral middle position so that the pressure difference can be maintained at a pressure level that will on the whole be low.

If valve piston 15 is shifted to the left, for example, the connection from piston groove 22 to the common opening 36 and between piston groove 23 and valve groove 33 is interrupted. This means that the connection from control line 38 to the reservoir 30 has been severed. Roughly simultaneously, the connection is established from the discharge opening 26 of pressure line 27 to the piston groove 23. As a result, pressure line 27 is connected with control line 38 via control opening 35B, with a cross-section depending on the position of valve piston 15. Control opening 35B here forms the variable orifice 35 described above. To maintain the constant pressure difference between pressure line 27 and control line 38, there must be a flow of pressure medium via orifice 35. The pressure medium flows via piston groove 23, common opening 36, and the segment 37 of pressure line 27 to the front-side pressure chamber 44, inside through valve piston 15 in all the way to the left-hand, front-side pressure chamber 43. From there, the pressure medium is conducted via the left-hand distribution grooves 41 and line 45 to the metering device 7. The pressure medium is supplied to the steering motor 20 via line 46 and the right-hand commutation grooves 42 from the displacement chambers 8 which are located on the discharge side of metering device 7. Without considering flow losses, the pressure in the pressure line 27 will adjust itself according to the resistance on the steering motor 20. When valve piston 15 is deflected to a maximum, orifice 35 reaches its maximum cross-section. A connection of discharge opening 26 of pressure line 27 into valve borehole 14 and of the common opening 36 with valve grooves 32, 33 is prevented because of the above-described arrangement of the spool lands 24 and 25.

I claim:

1. In a hydrostatic auxiliary power steering mechanism for motor vehicles including a metering device operated by a manual steering wheel, a control valve connected with the metering device and shifted from a neutral middle position in first and second opposite axial directions against the force of spring elements upon rotation of the steering wheel in opposite directions, respectively, a variable displacement pump having a pressure line connected with the control valve and a nonreturn line connected with a pressure medium reservoir, the pressure line containing an orifice and a control line beyond the orifice in the direction of flow, said control line being connected with an adjusting device for the variable displacement pump, the control line being connected with the non-return line when the control valve is in its neutral middle position, the control valve including a valve piston arranged in a valve borehole connected with the pressure line via a discharge opening thereof, the valve piston having an outer surface including a central spool land adjacent to the pressure line discharge opening and two spool lands spaced on either side of the central land to define a pair of grooves, the improvement which comprises
   (a) a segment of each of said pressure and control lines is connected with said valve borehole via a common opening arranged adjacent said piston central spool land; and
   (b) said orifice being defined by said piston central spool land and said pressure line discharge opening, said orifice having a cross-section that varies as a function of the position of said control valve, said orifice having a minimum cross-section when said control valve is in its neutral middle position, said orifice cross-section increasing as said control valve is shifted in opposite directions upon rotation of the steering wheel.

2. An auxiliary power steering mechanism as defined in claim 1, wherein said piston central spool land has a width greater than the width of the pressure line discharge opening.

3. An auxiliary power steering mechanism as defined in claim 2, wherein the width of said piston central spool land is less than the width of the common opening.

4. An auxiliary power steering mechanism as defined in claim 3, wherein said valve borehole contains a pair of nonreturn grooves connected with said pair of piston grooves, respectively, when said control valve is in its neutral middle position.

5. In a hydrostatic auxiliary power steering mechanism for motor vehicles including a metering device operated by a manual steering wheel, a control valve connected with the metering device and shifted from a neutral middle position in first and second opposite axial directions against the force of spring elements upon rotation of the steering wheel in opposite directions, respectively, a variable displacement pump having a pressure line connected with the control valve and a nonreturn line connected with a pressure medium reservoir, the pressure line containing an orifice and a control line beyond the orifice in the direction of flow, said control line being connected with an adjusting device for the variable displacement pump, the control line being connected with the non-return line when the control valve is in its neutral middle position, the control valve including a valve piston arranged in a valve borehole connected with the pressure line via a discharge opening thereof, the valve piston having an outer surface including a central spool land adjacent to the pressure line discharge opening and two spool lands spaced on either side of the central land to define a pair of grooves, the improvement which comprises
   (a) a segment of each of said pressure and control lines is connected with said valve borehole via a common opening arranged adjacent said piston central spool land;
   (b) said orifice being defined by said piston central spool land and said pressure line discharge opening, said orifice having a cross-section that varies as a function of the position of said control valve, said orifice having a minimum cross-section when said control valve is in its neutral middle position, said orifice cross-section increasing as said control valve is shifted in opposite directions upon rotation of the steering wheel; and
   (c) said piston central spool land has a width greater than the width of said pressure line discharge opening an contains an outer annular groove affording communication between said pressure line discharge opening and said common opening.

* * * * *